United States Patent
Hou et al.

(10) Patent No.: US 9,860,829 B2
(45) Date of Patent: Jan. 2, 2018

(54) MANAGEMENT APPARATUS AND METHOD FOR WIRELESS COMMUNICATIONS, APPARATUS FOR WIRELESS COMMUNICATIONS

(71) Applicant: Sony Corporation, Tokyo (JP)

(72) Inventors: Yanzhao Hou, Beijing (CN); Qimei Cui, Beijing (CN); Hui Liang, Beijing (CN); Qinyan Jiang, Beijing (CN); Tong Zhang, Beijing (CN); Xin Guo, Beijing (CN); Jinhui Chen, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 23 days.

(21) Appl. No.: 14/978,295

(22) Filed: Dec. 22, 2015

(65) Prior Publication Data

US 2016/0198395 A1    Jul. 7, 2016

(30) Foreign Application Priority Data

Jan. 4, 2015    (CN) .......................... 2015 1 0003474

(51) Int. Cl.
| | |
|---|---|
| *H04W 48/16* | (2009.01) |
| *H04W 28/12* | (2009.01) |
| *H04L 5/00* | (2006.01) |
| *H04W 24/00* | (2009.01) |
| *H04W 48/20* | (2009.01) |
| *H04W 72/02* | (2009.01) |

(52) U.S. Cl.
CPC .............. *H04W 48/16* (2013.01); *H04L 5/00* (2013.01); *H04W 24/00* (2013.01); *H04W 28/12* (2013.01); *H04W 48/20* (2013.01); *H04W 72/02* (2013.01)

(58) Field of Classification Search
CPC ..... H04W 48/16; H04W 28/12; H04W 24/00; H04W 48/20; H04W 72/02; H04L 5/00
See application file for complete search history.

(56) References Cited

U.S. PATENT DOCUMENTS

| | | | | |
|---|---|---|---|---|
| 2011/0069962 A1* | 3/2011 | Castor | ................ | H04B 10/1149 398/115 |
| 2013/0005376 A1* | 1/2013 | Shirani-Mehr | ..... | H04W 72/048 455/509 |
| 2013/0344877 A1* | 12/2013 | Ma | ........................ | H04W 16/04 455/446 |
| 2014/0003268 A1* | 1/2014 | Zarifi | .................. | H04W 72/121 370/252 |
| 2014/0080532 A1* | 3/2014 | Oh | ........................ | H04W 28/26 455/512 |
| 2014/0113643 A1* | 4/2014 | Ma | ........................ | H04B 7/024 455/452.1 |

(Continued)

*Primary Examiner* — Brandon Miller
(74) *Attorney, Agent, or Firm* — Oblon, McClelland, Maier & Neustadt, L.L.P.

(57) ABSTRACT

The present disclosure provides a management apparatus and a method for wireless communication as well as an apparatus and a method for wireless communication. The management apparatus includes: a determining module, configured to select a communication unit satisfying a predetermined condition from among a communication unit cluster managed by the management apparatus, and determine interference information or load information of at least part of resource blocks corresponding to the communication unit.

19 Claims, 6 Drawing Sheets

(56) References Cited

U.S. PATENT DOCUMENTS

| | | | |
|---|---|---|---|
| 2015/0043390 A1* | 2/2015 | Wang | H04W 24/02 370/280 |
| 2015/0092704 A1* | 4/2015 | Chen | H04W 72/1231 370/329 |
| 2017/0013025 A1* | 1/2017 | Shakhov | H04L 65/1046 |

* cited by examiner

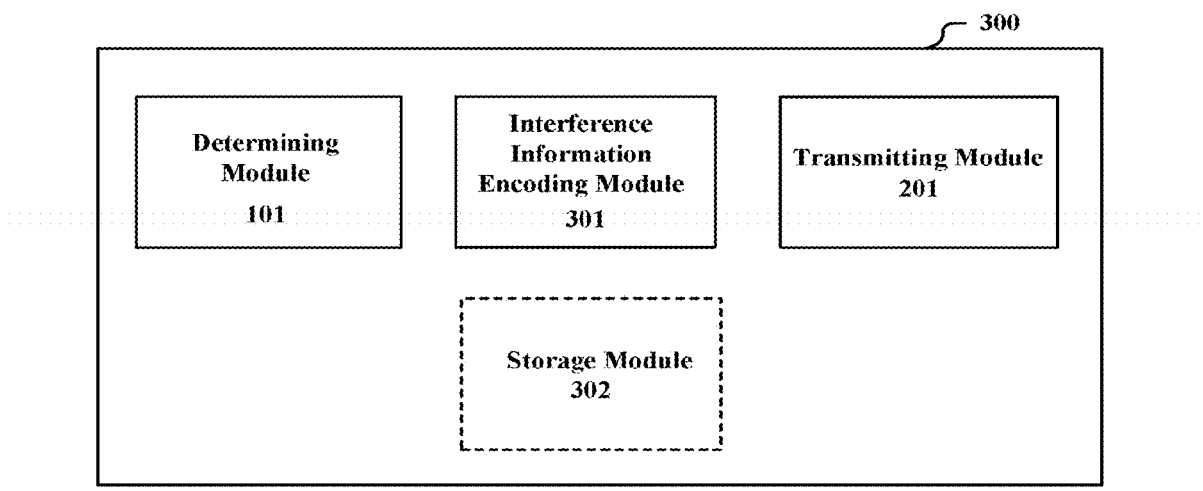
Fig. 4
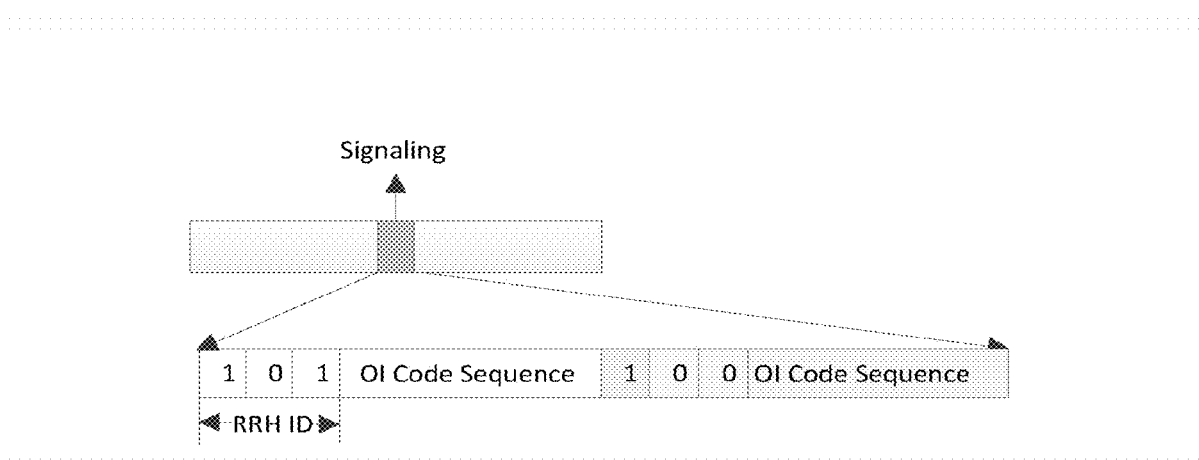
Fig. 5
| RB Index | 1 | 2 | 3 | 4 | 5 | 6 | 7 | 8 | ...... | 98 | 99 | 100 |
|---|---|---|---|---|---|---|---|---|---|---|---|---|
| Interference Level | L | L | L | M | L | M | H | H | ...... | M | L | L |
| OI Code Sequence | 00 | 00 | 00 | 10 | 00 | 10 | 11 | 11 | ...... | 10 | 00 | 00 |
Fig. 6

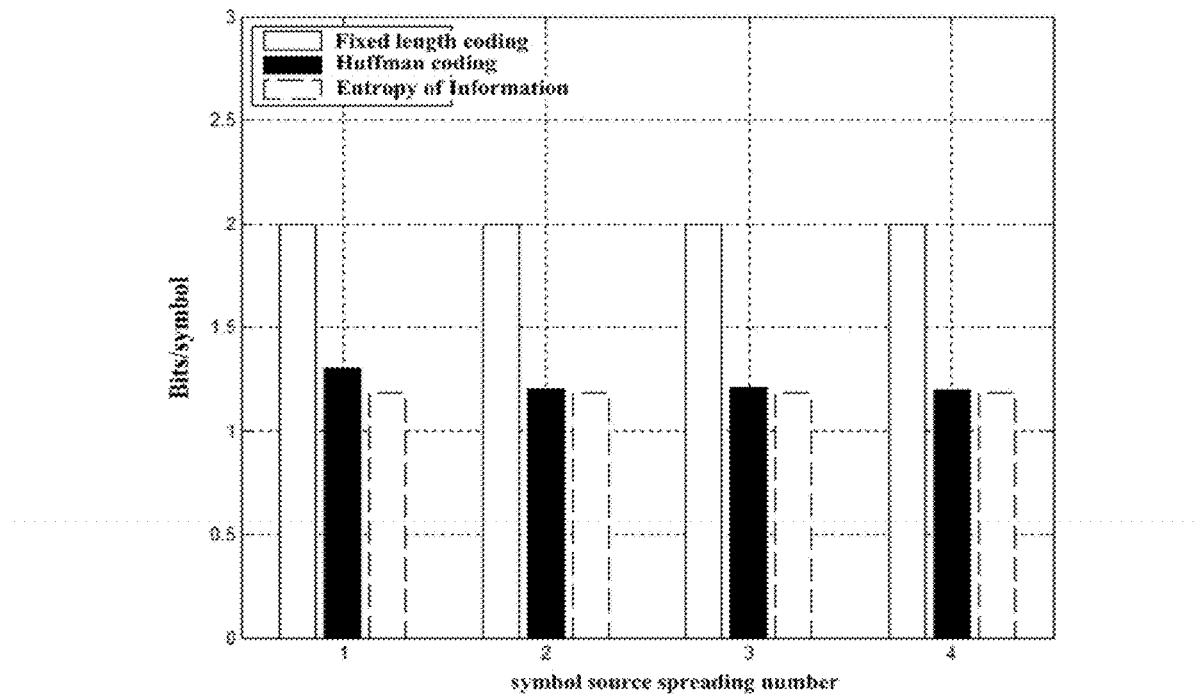
Fig. 7
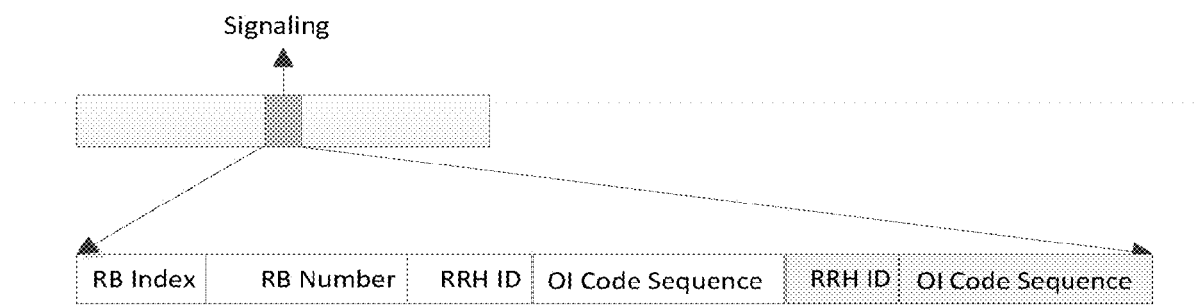
Fig. 8
| BBU ID | RRH ID | Adjacent RRH ID |
|--------|--------|-----------------|
| A | 3 | 0 |
| A | 4 | 0,1 |
| A | 5 | 1,2 |
| A | 6 | 2 |
Fig. 9

MANAGEMENT APPARATUS AND METHOD FOR WIRELESS COMMUNICATIONS, APPARATUS FOR WIRELESS COMMUNICATIONS

FIELD OF THE INVENTION

The embodiments of the present invention generally relate to the field of wireless communications, and particularly relate to a management apparatus and a management method for determining interference information or load information of a communication unit, as well as an apparatus and a method for notifying the interference information or load information.

BACKGROUND OF THE INVENTION

In wireless communications, adjacent cells managed by the same operator need to interchange respective interference information or load information, so as to perform corresponding operations such as adjustment or coordination, thereby improving communication system performance such as by reducing interferences and the like.

For example, under the CRAN scenario, centralized processing and distributed antennas have become the main features. For example, the range served by each of the remote radio heads (RRHs) can be taken as a CRAN cell.

However, in CRAN, since signals of different RRHs are processed in a base band unit (BBU) in a centralized manner, the case where the backhaul link between base stations is not ideal in conventional situations will not occur, and thus joint processing can be achieved, so that interferences within CRAN cells which are within the range managed by the same BBU are easy to be eliminated. However, the interferences between management ranges of different BBUs are still to be taken into consideration. Therefore, it is necessary to propose a mechanism which performs effective processing with respect to interference or load related information under the CRAN scenario.

In addition, current communication networks are generally deployed and operated by different communication operators. The network of each operator occupies a particular communication spectrum, and thus no serious interferences are produced to each other. However, with the application of the unlicensed spectrum (referred as the LAA authorized assisting access spectrum in some documents) such as the WiFi spectrum into the cellular communication systems, different operators may use the resources of the same unlicensed spectrum, thereby producing greater interferences. Therefore, how to achieve interchange of the interference information or load information between communication network entities managed by different operators so as to perform coordination across cells of operators has become a problem focused in the field.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present application, there is provided a management apparatus for wireless communication, comprising processing circuitry, the processing circuitry being configured to select a communication unit satisfying a predetermined condition from among a communication unit cluster managed by the management apparatus, and determine interference information or load information of at least part of resource blocks corresponding to the communication unit.

According to another aspect of the present application, there is further provided a management method for wireless communication, comprising: selecting a cell satisfying a predetermined condition from among a cell cluster subject to management, and determining interference information or load information of at least part of resource blocks corresponding to the cell.

According to still another aspect of the present invention, there is provided an apparatus for wireless communication comprising processing circuitry configured to: determine interference information or load information of at least part of resource blocks of a communication unit corresponding to the apparatus; and transmit the interference information or load information to the corresponding management apparatus, when the communication unit satisfies a predetermined condition.

According to another aspect of the present application, there is further provided a method for wireless communication, comprising: determining interference information or load information of at least part of resource blocks of a communication unit involved in communication; and transmitting the interference information or load information to a management apparatus corresponding to the communication unit, when the communication unit satisfies a predetermined condition.

According to other aspects of the present invention, there are further provided computer program codes and computer program product for implementing the above mentioned management method and method for wireless communications, as well as a computer readable storage medium on which computer program codes for realizing the aforementioned management method and method for wireless communications are recorded.

The apparatus and method according to the present invention determines the interference information or load information of just partial communication units by setting a predetermined condition, thereby reducing the processing load and the required transmitting resources.

These and other advantages of the present invention will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings:

FIG. 4 is a structural block diagram illustrating the management apparatus for wireless communications according to another embodiment of the present application;

FIG. 5 is an example illustrating a signaling format for transmitting the interference information;

FIG. 6 is a schematic drawing illustrating an example of the overload indication code sequence;

FIG. 7 is a drawing illustrating the comparison of simulation results of signaling overhead using Huffman Coding and fixed length coding;

FIG. 8 is an example illustrating another signaling format for transmitting the interference information;

FIG. 9 is an example of the physical neighborhood relationship list;

DETAILED DESCRIPTION OF THE INVENTION

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

<The First Embodiment>

Figure 1:
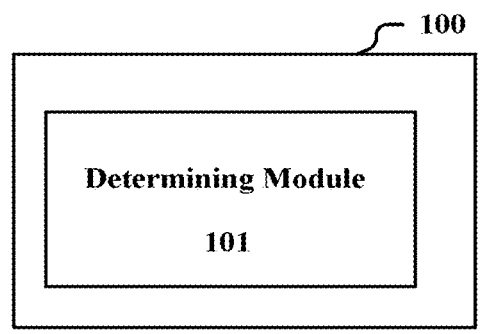
FIG. 1 is a structural block diagram illustrating the management apparatus for wireless communications according to an embodiment of the present application.

FIG. 1 illustrates a structural block diagram of a management apparatus 100 for wireless communications according to an embodiment of the present application. The management apparatus 100 includes processing circuitry (in the following, the same reference numeral is used for both the apparatus and the processing circuitry thereof), and as shown in FIG. 1, the processing circuitry includes: a determining module 101, configured to select a communication unit satisfying a predetermined condition from among a communication unit cluster managed by the management apparatus, and determine interference information or load information of at least part of resource blocks corresponding to the communication unit.

The communication unit cluster can be a set of communication units associated with the same management apparatus 100, and the communication unit can be various kinds of communication networks, communication systems or sub-systems. For example, the communication unit can be a traditional cell (such as macro cell/small cell) in cellular communications, a CRAN cell corresponding to a RRH (the range covered by the signals of one RRH) in a CRAN system, D2D communication device pair/cluster (D2D pair/cluster), each primary system and secondary system in a cognitive radio system, and so on.

The management apparatus 100 can be located in a central controlling node. For example, in the CRAN scenario, the management apparatus 100 can be located in a BBU pool (or referred as BBU cloud), and manage a plurality of CRAN cells covered by the BBU pool. As another example, in the scenario where there are interactions across operators, the management apparatus 100 can be located on the core network side, and has an interface for information interchanging with other operators. Alternatively, the management apparatus 100 can be located in Internet, for information interchanging among multiple operators. In the cognitive radio system, the management apparatus 100 can be located for example in a geographical location database (GLDB) or a spectrum management apparatus in the cognitive radio system, and manages the communication systems (units) managed by the geographical location database or spectrum management apparatus correspondingly. Of course, the management apparatus can be provided as a separate apparatus, and communicates with the central controlling node in a wired/wireless manner.

The determining module 101 does not determine the interference information or load information for all of the communication units in the managed communication unit cluster. Instead, the determining module 101 selects a part (or all) of the communication units from among the communication unit cluster according to the predetermined condition, to determine the interference information or load information of at least part of resources blocks corresponding to the selected communication units. For example, it is possible to determine the interference information or load information of all the resources blocks configured for these communication units, or just determine the interference information or load information of the part of resources blocks which are currently in use by these communication units. In one example, the determining module 101 is configured to take the resource blocks allocated to particular user devices of the communication unit as the at least part of resource blocks, i.e., only determines the interference information or load information of this part of resource blocks. In an example where the resources of unlicensed spectrum are coordinated across operators, the determining module 101 only determines the interference information or load information of the communication units which support unlicensed spectrum among the communication unit cluster managed. Furthermore, the determining module 101 determines the interference information or load information of the resource blocks on unlicensed spectrum allocated to particular user devices in the communication units which support unlicensed spectrum.

Therefore, a proper predetermined condition can be set to properly select communication and resource blocks whose interference information or load information is to be determined, so as to reduce unnecessary processing and decrease the processing load.

Wherein, the predetermined condition can be a condition related to at least one of properties, communication quality, and communication requirements of the communication unit. For example, the predetermined condition can be selected from the group consisting of: the communication unit having a high priority level for making use of spectrum resources, the communication unit being located at edge of regions managed by the two management apparatus, the communication unit being provided with QoS guarantee, the communication unit makes use of an unlicensed spectrum, and any combination thereof. By setting such a predetermined condition, communication units with high priority level or subject to serious interferences for example can be selected to determine the interference information or load information thereof.

In one example, the determining module 101 is further configured to select the communication unit according to channel quality and/or intensity of interference the communication unit is subject to. For example, in a scenario involving Coordinated Multiple Points Transmission (COMP) especially joint processing (JP), the determining module 101 can select a communication unit with a relatively high intensity of interference and good channel quality. Specifically, for example, the determining module 101 chooses a part of cells with highest intensity of interference from among the plurality of cells involved in the joint receiving (JR) for the user device, and selects one or more cells (less than all the JR cells) from therein to serve as the objects to be determined. This is because, the interference information and load information of such communication units have most guidance significance, and by using such information, the communication quality of the communication units can be improved to the largest extent.

In still another example, the determining module 101 is configured to select a communication unit depending on whether there are edge user devices in the communication unit. For example, in the case where the geographical ranges across which the different operators make use of the unlicensed spectrum overlap with each other, the user devices performing LAA transmission within the overlapping range may become the edge user devices due to the receiving of intensive signals at the same frequency but from a base station of the different operator. The determining module 101 then selects the cells containing such user devices as objects whose transmitting resources interferences or load are to be determined. In addition, for example, in the cognitive radio communication system, in the case that the distribution ranges of secondary systems managed by different geographical location databases (GLDBs) overlap with each other, secondary users contained in the secondary systems which are located in the overlapping range and operating according to the available frequency spectral resources provided by respective GLDB may become the edge secondary users because of the intensive interference to each other as well. The determining module 101 then selects such secondary systems as objects whose transmitting resources interferences or load are to be determined. As another example, in the scenario of C-RAN, the C-RAN cells located at the edge of controlling ranges of two BBU pools may also contain such user devices, which can receive relatively intensive signals of an adjacent C-RAN cell managed by another BBU pool. The determining module 101 then selects the C-RAN cells containing such user devices as objects whose transmitting resources interferences or load are to be determined. In the following embodiments detailed description will be made by taking the C-RAN scenario as an example.

Wherein, the interference information can include for example an ID of the communication unit and information representing the interference level the communication unit is subject to. Correspondingly, the load information can include for example an ID of the communication unit and information representing the amount of the load of the communication unit. The specific information format can be set according to the application scenario and the characteristics of the communication units. In the following embodiments, the specific information format will be given taking the C-RAN scenario as an example.

In summary, the management apparatus 100 according to the present embodiment can selectively determine the interference information or load information by setting the predetermined condition, reducing the processing load.

<The Second Embodiment>

Figure 2:
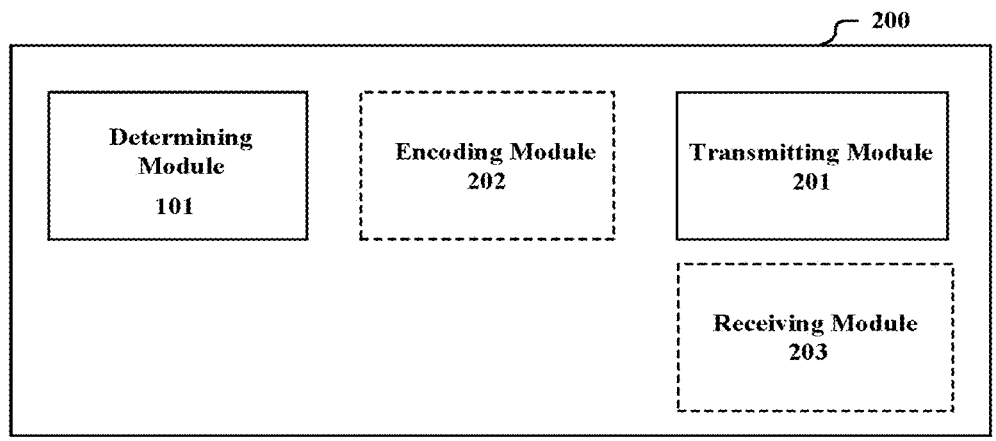
FIG. 2 is a structural block diagram illustrating the management apparatus for wireless communications according to another embodiment of the present application.

FIG. 2 illustrates a structural block diagram of a management apparatus 200 for wireless communications according to another embodiment of the present application. Besides the module shown in FIG. 1, the management apparatus (or the processing circuitry thereof) 200 further includes: a transmitting module 201, configured to transmit the interference information or load information to a corresponding management apparatus when communication state of the communication unit satisfies a triggering condition, wherein the corresponding management apparatus correspond to another communication unit cluster.

That is, the management apparatus 200 decides whether to transmit the related information to another management apparatus by detecting whether the communication state of the selected communication unit satisfies the triggering condition. Wherein, the triggering condition is a condition related to the communication state, and will be described in detail later.

Wherein, the communication state of the communication unit for example can include an interference-to-noise ratio (INR) or a signal-to-interference ratio (SIR) detected by the communication unit. For example, when the INR or SIR reaches a certain threshold, the communication unit transmits the triggering notification to the management apparatus 200, so that the transmitting module 201 performs transmitting of information. Another example, the communication unit transmits the measured INR or SIR to the management apparatus 200, so that the management apparatus 200 detects whether the INR or SIR reaches the threshold by itself, and triggers the transmitting of the interference information or load information.

As a further example, the communication unit performs measurement with respect to the uplink resources used by particular user devices to determine the INR or SIR. For example, as for the user device operating on the unlicensed spectrum and subject to interferences from an adjacent cell of a different operator, the INR or SIR of the user device on the resource blocks of unlicensed spectrum configured for this user device is measured. For another example, in the cognitive radio system, as for a first secondary system subject to the interferences from the secondary systems managed by the adjacent GLDB, the access nodes in the first secondary system measures the INR or SIR on the available resources allocated to the secondary users. For still another example, as for a user device subject to interferences from the C-RAN cells managed by the adjacent BBU pool, the INR or SIR of the resources blocks configured for the user device is measured.

In addition, as shown by the dashed line block in FIG. 2, the management apparatus (or the processing circuitry thereof) 200 can further include: an encoding module 202, configured to encode the interference information or the load information into variable-length codes to be transmitted by the transmitting module 201. For example, the inventor of the present application discovers that the interference information or load information of the communication units generally meets a particular distribution such as has statistic characteristics. Therefore, the encoding module 202 is designed to perform Huffman coding, which can significantly reduce the overhead of the signaling. In an example of the present invention, the interference information or load information is the interference status on all of the uplink resources configured for the communication units selected by the determining module. Of course, the determining module 202 can also perform fixed length coding or other kinds of variable length coding on the interference information or load information.

As shown by another dashed line block in FIG. 2, the management apparatus (or the processing circuitry thereof) 200 can further include: a receiving module 203, configured to receive the interference information or load information transmitted by a management apparatus corresponding to another communication unit cluster. In other words, different management apparatus can perform interaction of signaling therebetween.

It can be seen that the present embodiment can be implemented as long as there is a channel for signaling interaction between two management apparatus. wherein, the two management apparatus delivering the interference information or load information to each other can belong to the same operator (such as two BBU pools managed by the same operator), and can also belong to different operators (such as the management apparatus deployed by different operators for using the unlicensed spectrum coordinatively).

The management apparatus 200 according to the present embodiment transmit the interference information or load information of the selected communication units to another management apparatus according to the communication state of the communication units, achieving information interaction based on the triggering mechanism.

<The Third Embodiment>

Figure 3:
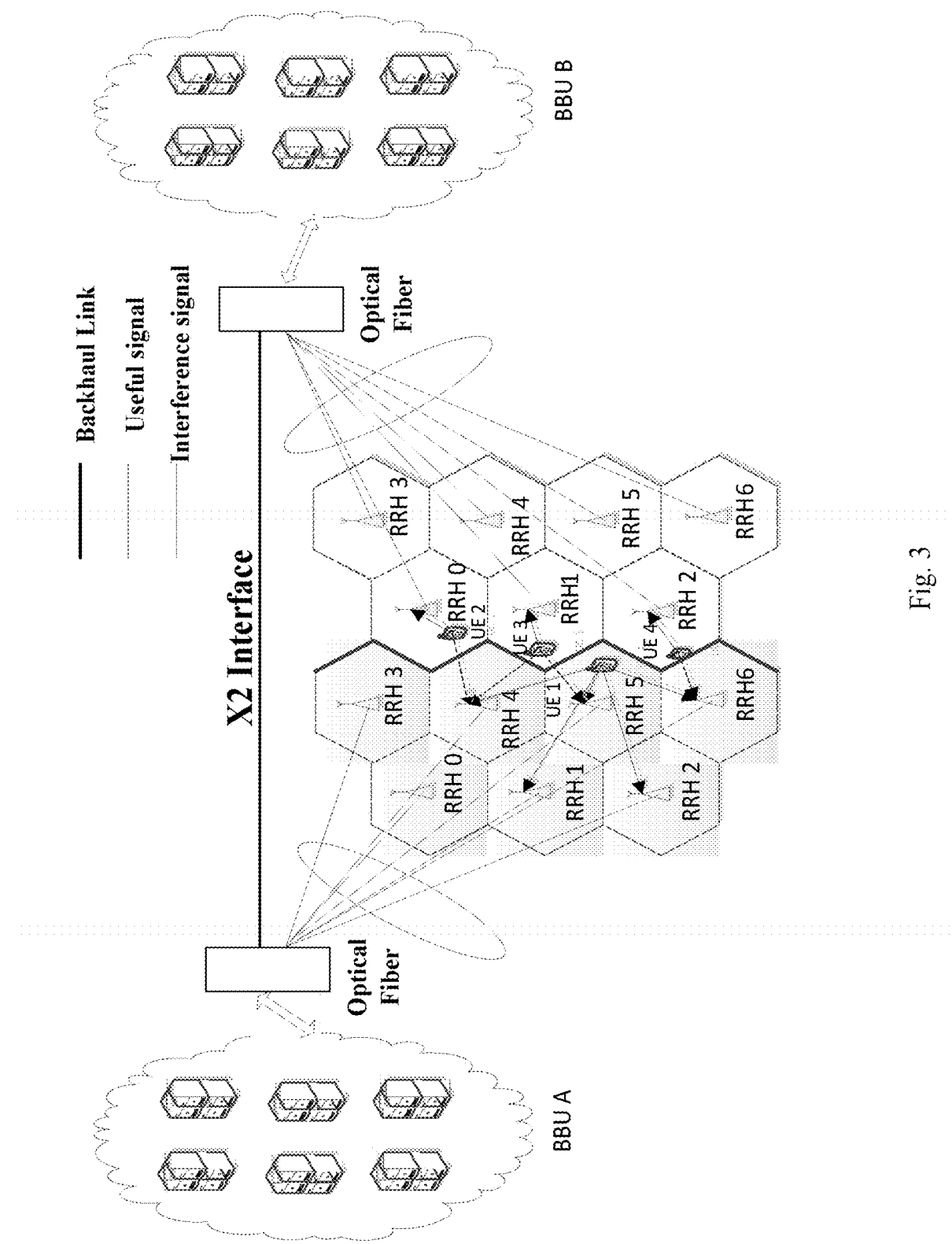
FIG. 3 shows a schematic drawing of the CRAN scenario.

In this embodiment, the application of the management apparatus 200 according to the present application in the CRAN scenario will be described in detail. FIG. 3 shows a schematic drawing of the CRAN scenario. As shown in FIG. 3, each hexagon is the range covered by a RRH, which is referred as a CRAN cell here (hereinafter also referred as a RRH). Each BBU covers multiple CRAN cells, that is, performs communication with the multiple CRAN cells via the optical fiber and executes various processing, and the signaling interaction can be performed via an X2 interface between BBUs. Wherein, the CRAN cells managed by the BBU A on the left side and the CRAN cells managed by the BBU B on the right side are bounded by the bolded broken line in the middle. It can be seen that, when RRHs 1-6 of BBU A perform joint receiving with respect to UE1, the signal received from UE1 is the useful signal, while the signals received from other UEs such as UE2-UE4 are interference signals. It is to be understood that, FIG. 3 is just an example of the CRAN, and the configuration is not limited thereto.

In such a situation, the communication unit cluster is the CRAN cell cluster, and the communication unit is the CRAN cell. The determining module 101 is configured to take an edge CRAN cell serving edge user devices as the communication unit satisfying the predetermined condition.

Wherein, users located between two CRAN cell clusters are the edge users. As an example, the users satisfying the following equation are defined as the edge users:

$$RSRP_{served} - RSRP_{neighbor} < \epsilon \quad (1)$$

Wherein, $RSRP^{served}$ is the reference signal receiving power (RSRP) of the currently accessed CRAN cell which is measured by the user device, $RSRP_{neighbor}$ is the measured RSRP value of the adjacent CRAN cell, and $\epsilon$ is an acceptable empirical value and can be determined in particular in practice according to the requirements.

The CRAN cell to which the user device determined as an edge user is currently accessed is determined as the edge CRAN cell. The determining of the edge CRAN cell can be performed periodically. Specifically, for example, the user device performs the judgment of equation (1) periodically, and provides notification to the RRH of the currently accessed CRAN cell when deciding that it is an edge user. Then, the RRH performs corresponding processing, or performs no processing but just notifies corresponding management apparatus of the result. Of course, the determining of the edge user can also be performed by the RRH or corresponding BBU.

When the determining module 101 of the management apparatus determines that one CRAN cell is an edge CRAN cell, the determining module 101 determines the interference information of at least part of resource blocks of the CRAN cell.

As stated previously, since the interferences within the CRAN cell cluster can be effectively avoided, the interaction of the interference information is not necessary among the internal cells. Therefore, the management apparatus just selects the edge CRAN cells as the processing objects to determine their interference information, and the processing load can be reduced, and further the overhead of signaling when interacting with another management apparatus can be reduced.

As another example, the determining module 101 can be configured to take resource blocks allocated to the edge user devices as the at least part of resource blocks. This can further reduce the processing load and the signaling overhead.

The transmitting module 201 is configured to transmit the interference information to a corresponding management apparatus when the communication state of the edge CRAN cell satisfies the triggering condition, wherein the corresponding management apparatus correspond to another CRAN cell cluster. In other words, the interaction of the interference information between apparatus can be based on the triggering mechanism.

The triggering condition is a condition related to the communication state of the CRAN cell. As non-limiting examples, the triggering condition can be selected from the group consisting of: the interference-noise ratio (INR) of the edge CRAN cell being below a predetermined threshold; the signal-to-interference ratio (SIR) of the edge CRAN cell being lower than a second predetermined threshold in the case of emitting power of the user device reaching a predetermined emitting power value, and a combination thereof.

In the first triggering condition, as for the edge CRAN cell i, its INR can be defined as follows:

$$INR(i) = \frac{\text{Interference Power}(i)}{N_0 W}(i) \quad (2)$$

Wherein, $N_0$ is the power spectral density of thermal noise over the whole system bandwidth, W is the bandwidth configured for the corresponding edge users. In this mechanism, the emitting power of the user devices is not taken into consideration, and thus the frequency of triggering is relatively high.

In the second triggering condition, the priority level of the service quality for the current user device is higher than that for the users of the adjacent cell, and when the SIR is lower than the second predetermined threshold, the emitting power of the user device is increased at first. If the emitting power reaches the predetermined emitting power value, but the SIR is still lower than the second predetermined threshold, the transmitting of the interference information is triggered.

It is to be noted that, when the multiple edge CRAN cells performs joint receiving with respect to the edge user devices, the above mentioned INR and SIR are average values among the multiple edge CRAN cells. In addition, in the practical application, one of the above mentioned two triggering conditions can be selected or the two can be used in combination depending on the specific application context. Of course, other triggering conditions can further be set according to practical application requirements.

As an example, when the multiple edge CRAN cells performs joint receiving with respect to the edge user devices, the determining module 101 is further configured to select, based on an overload indication value which is in direct proportion to the intensity of interference with CRAN cells and in inverse proportion to the channel quality, N edge CRAN cells from among the multiple edge CRAN cells to transmit their interference information, N being an integer and set according to the overload indication value.

In the joint receiving, the multiple edge CRAN cells perform uplink receiving with respect to the edge user devices, and all of the multiple edge CRAN cells may be subject to the interferences from the user devices of the adjacent cell clusters, requiring the implementing of inter-ference coordination. However, it may be unnecessary to transmit the conditions of being interfered for every edge CRAN cell. Transmitting the interference information of only part of the edge CRAN cells can improve the communication quality of the user devices significantly, thereby further reducing the signaling overhead.

Therefore, this example defines the overload indication value which is in direct proportion to the intensity of interference and in inverse proportion to the channel quality, and determines the number N of edge CRAN cells to be selected according to this overload indication value.

Hereinafter a specific example of the overload indication (OI) value is given. Wherein, M is the number of the edge CRAN cells which perform the joint receiving, w is a weight related to the channel quality, and Interference (i) is the uplink interference power from the user device of the adjacent cell cluster which the i-th edge CRAN cell is subject to.

$$OI = \sum_{i=1}^{M} w(i) * \text{Interference}(i) \quad (3)$$

For example, w can be obtained by linearly quantizing the channel quality which can be represented for example using channel quality indication (CQI), signal to noise ratio (SNR), signal to interference and noise ratio (SINR) and the like. When using CQI to represent the channel quality, the smaller the CQI is, the worse the channel quality is, otherwise the channel quality is better. For example, CQI can be quantized as follows:

If $0 \leq CQI < 4$, then w(i)=4;
If $4 \leq CQI < 8$, then w(i)=3;
If $8 \leq CQI < 12$, then w(i)=2;
If $12 \leq CQI < 15$, then w(i)=1;

Based on the number of the edge CRAN cells performing the joint receiving, for example different thresholds and number N can be specified to perform the judgment. For example, there is M=3 edge CRAN cells performing the joint receiving with respect to the user device, and the preset two thresholds are TH1 and TH2, then N can be set as follows: if $OI \leq TH1$, then N=1; if $TH1 < OI \leq TH2$, then N=2; and if $OI > TH2$, then N=3.

It should be appreciated that the above mentioned definition and determination of the OI value is just an example, but not limited thereto, and can be modified in various manners according to practical application.

In addition, the determining module 101 can be configured to choose edge CRAN cells with a relatively high intensity of interference and good channel quality. This is because the transmitting of the interference information of such edge CRAN cells can improve the communication quality of the user devices more significantly.

For example, the priority level for transmitting the interference information of the edge CRAN cells can be determined by defining a parameter y. Specifically, y can be defined to be in direct proportion to the intensity of interference and the channel quality, for example as illustrated in following equation (4).

$$y(i) = \frac{\text{Power of Interference Signal}}{\text{Channel Attenuation}} \quad (4)$$

Wherein, the channel attenuation is represented by for example the different between the uplink transmitting power of the user device and the receiving power of the i-th edge CRAN cell with respect to the user device.

After determining the number N and the priority level of each edge CRAN cell, the transmitting module 201 transmits the interference information of the final selected N edge CRAN cells to another management apparatus. The interference information includes IDs of the edge CRAN cells (i.e., IDs of the RRHs) and the information of interference levels the edge CRAN cells are subject to. Wherein, the ID can be allocated by respective BBUs on their own, or can be globally allocated by the operators or the like.

The management apparatus 200 according to this embodiment interchanges the interference information of only part or all of the edge CRAN cells, avoids the unnecessary delivering of interference information for internal CRAN cells in the CRAN cell cluster, and reduces the signaling overhead.

<The Fourth Embodiment>

FIG. 4 illustrates the structural block diagram of the management apparatus 300 according to another embodiment of the present application. Besides the determining module 101 and the transmitting module 201 shown in FIG. 2, the management apparatus (or the processing circuitry thereof) 300 further includes: an interference information encoding module 301, configured to encode the interference information into variable length codes to be transmitted by the transmitting module 201.

When transmitting the interference information, the interference level indication needs to be made in the unit of a resource block (RB). Referring back to FIG. 3, assuming that each CRAN cell cluster includes 7 CRAN cells, their IDs being 0 to 6 respectively, and UE1 is jointly received by 5 RRHs, three of which are subject to the interferences from the UEs of adjacent CRAN cell clusters. Assuming that the determining module 101 determines the transmitting of interference information is required and the interference information of 2 RRHs is to be transmitted, the determined priority level is: RRH 5>RRH 4>RRH 6>RRH 1>RRH 2.

Existing signaling can be used to transmit the interference information, or other signaling format can be additionally defined otherwise. As an example, a variant of the OI signaling proposed under LTE context can be adopted.

FIG. 5 shows an example of the signaling format for transmitting the interference information. Wherein, "OI code sequence" denotes the encoding sequence of the interference levels corresponding to all of RBs of the RRHs indicated by the previous RRH IDs. For example, the interference level can be divided into three levels "low (L), Medium (M), High (H)", each encoded with 2 bits, and for example the 3 levels can be encoded as "00, 10, 11" respectively.

In addition, assuming that each RRH has 100 RBs for uplink transmission, the OI code sequence can be as shown in FIG. 6. In this situation, only less part of RBs will be scheduled to the edge user devices and most RBs will be scheduled to the central user devices. The interferences the central user devices are subject to can be considered to be L by default, and only the interference level of the edge user devices can be M or H. Therefore, the probability of occurrence of L is higher than that of M and H, the symbol sets having such statistic characteristics can be encoded with variable length coding such as Huffman coding, to allow reduction of the signaling overhead.

Taking FIG. 6 as an example, assuming the probabilities of occurrence of symbols L, M an H are $p_L=0.7$, $p_M=0.2$, $p_H=0.1$ respectively, the simulation is performed and the results are as shown in FIG. 7. In FIG. 7, the 2 bits of the interference level of each RB are taken as one symbol, the lateral axis denotes the symbol source spreading number, that is, the number of symbols to be encoded together, and the vertical axis denotes the number of bits of each symbol, that is, the signaling overhead. As for each kind of symbol source spreading, fixed length coding and Huffman coding are performed respectively. The results of the fixed length coding are denoted by solid link blocks, the results of the Huffman coding are denoted by the blocks filled with black. In addition, the dashed line blocks denote the entropy of information, i.e., the lowest signaling overhead in principle. It can be seen that, after spreading the symbol source for twice, the signaling overhead of the Huffman coding can be reduced by about 42% compared with that of the fixed length coding.

The following equation (5) shows the signaling overhead when performing interaction of the interference information in the above mentioned situation.

$$N_{RRH}*(N_{bit}^{RRH\ ID}+\text{avg.}(N_{bit}^{OI\ level})*N_{RB}) \quad (5)$$

Wherein, $N_{RRH}$ is the number of RRHs whose interference information is determined to be transmitted by the transmitting module 101, $N_{RB}$ is the number of RBs, avg. $(N_{bit}^{OI\ level})$ is the average code length of the Huffman coding, and $N_{bit}^{RRH\ ID}$ is the code sequence length when coding the RRH ID.

As stated in the third embodiment, the determining module 101 can be configured to take the resource blocks allocated to the edge user devices as the at least part of resource blocks. In other words, the transmitted interference information does not contain the interference information of all the RBs, but just includes the interference information of the RBs which are allocated to the edge user devices. FIG. 8 shows a format of a kind of signaling for use in such a situation. In FIG. 8, the RB index is an index of the starting RB among the continuous RBs configured for the edge user device, and RB number is the number of RBs which the edge user device can schedule. In this format, the transmitted RBs each serve the edge user device, and the distribution of the interference levels is random, without maintaining the above mentioned statistic characteristics. Therefore, the fixed length coding can be adopted. The signaling overhead is shown in the following equation (6).

$$N_{bit}^{RB\ INDEX}+N_{bit}^{RB\ NUMBER}+N_{RRH}*(N_{bit}^{RRH\ ID}+\text{avg.}(N_{bit}^{OI\ level})*N_{RB}) \quad (6)$$

Wherein, $N_{bit}^{RB\ INDEX}$ and $N_{bit}^{RB\ NUMBER}$ are lengths of the code sequences for encoding the RB index and the RB number respectively, which can be considered to be equal to each other for example, and the other symbols have the same definitions as those in equation (5).

In addition, as shown by the dotted line block in FIG. 4, in order to allow the management apparatus to know at which CRAN cell it managed response is to be made upon receiving the signaling of the interference information, the management apparatus (or the processing circuitry thereof) 300 can further include: a storage module 302, configured to store a physical neighborhood relationship list of neighborhood relationship among CRAN cells of adjacent CRAN cell clusters.

Still taking FIG. 3 as an example, FIG. 9 shows an example of the list. Wherein, BBU A represents the interfered CRAN cell cluster, BBU B is the adjacent cell cluster, the adjacent RRH ID is the ID of an RRH in BBU B, and the list records the physical neighborhood relationship of each RRH covered by BBU A and BBU B.

It is to be understood that, although not shown in FIG. 4, the management apparatus (or the processing circuitry thereof) 300 can further include the receiving module 203 described with reference to FIG. 2, the interference information encoding module 301 is a specific example of the encoding module 202 in FIG. 2.

The embodiment makes specific description with respect to the CRAN scenario. However, this is just for the purpose of understanding, and is not intended to limit the application of the present application to the CRAN scenario. The apparatus 100-300 of the present application can be used in any situation where it is necessary to selectively determine/deliver the interference information or load information.

<The Fifth Embodiment>

Figure 10:
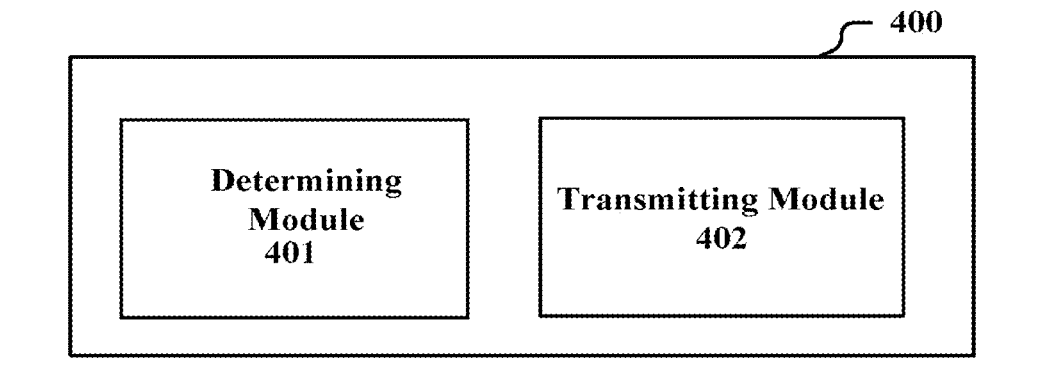
FIG. 10 is a structural block diagram illustrating the apparatus for wireless communications according to an embodiment of the present application.

FIG. 10 illustrates the structural block diagram of the apparatus 400 for wireless communications according to an embodiment of the present application. The apparatus 400 includes processing circuitry (in the following, the same reference numeral is used for both the apparatus and the processing circuitry thereof), and as shown in FIG. 10, the processing circuitry includes: a determining module 401, configured to determine interference information or load information of at least part of resource blocks of a communication unit corresponding to the apparatus; and a transmitting module 402, configured to transmit the interference information or load information to the corresponding management apparatus, when the communication unit satisfies a predetermined condition.

The apparatus 400 can be located for example in the communication unit or attached to the communication unit. In the CRAN scenario, the apparatus 400 can be located in each CRAN cell, for example, can be a part of the RRH or be attached to the RRH.

Wherein, the determining module 401 can determine the interference information or load information of all the resource blocks of the corresponding communication units, or can determine the interference information or load information of the resource blocks currently in use.

In one example, the determining module 401 is configured to take resource blocks allocated to particular user devices served by the communication unit as the at least part of resource blocks. In other words, the determining module 401 only determines the interference information or the load information of this part of resource blocks. Similarly, the predetermined condition can be a condition related to at least one of properties, communication quality, and communication requirements of the communication unit.

For example, in CRAN scenario, the communication unit is the CRAN cell, the transmitting module 402 is configured to, in the case that the communication unit is an edge CRAN cell serving edge user devices, transmit its interference information to the corresponding management apparatus. Wherein, the transmitting module 402 can only transmit the interference information of resource blocks allocated to the edge user devices.

Wherein, as for the judgment whether a communication unit is the edge CRAN cell, it can be for example performed by the user device or the apparatus 400 in the manner stated in the third embodiment.

It is to be noted that, the management apparatus herein can be any one of the management apparatus 100-300 described above with reference to the first to the fourth embodiment, and can also be BBU, GLDB, spectrum management apparatus corresponding to the communication unit, or other similar device.

The apparatus 400 according to this embodiment can transmit the interference information or load information of particular resource blocks of the communication units satisfying the predetermined condition to the management apparatus, and at least one of the following benefits can be obtained: reducing the data amount to be delivered effectively, mitigating the data transmitting load between the apparatus 400 and the management apparatus, and improving the communication efficiency.

<The Sixth Embodiment>

It is apparent that some processing or methods are also disclosed in the description above on the management apparatus and apparatus for wireless communications according to embodiments of the present invention. Below, the summary of the methods is described without repeating the details which are already discussed above, however, it should be noted that although disclosed in the description of the management apparatus and apparatus for wireless communications, the methods do not certainly employ or are not certainly executed by the aforementioned components. For instance, embodiments of the management apparatus and apparatus for wireless communications may be partially or completely achieved by hardware and/or firmware, and the management method and method for wireless communications described below may be fully achieved by a computer-executable program, although the methods may employ the hardware and/or firmware of the management apparatus and apparatus for wireless communications.

Figure 11:
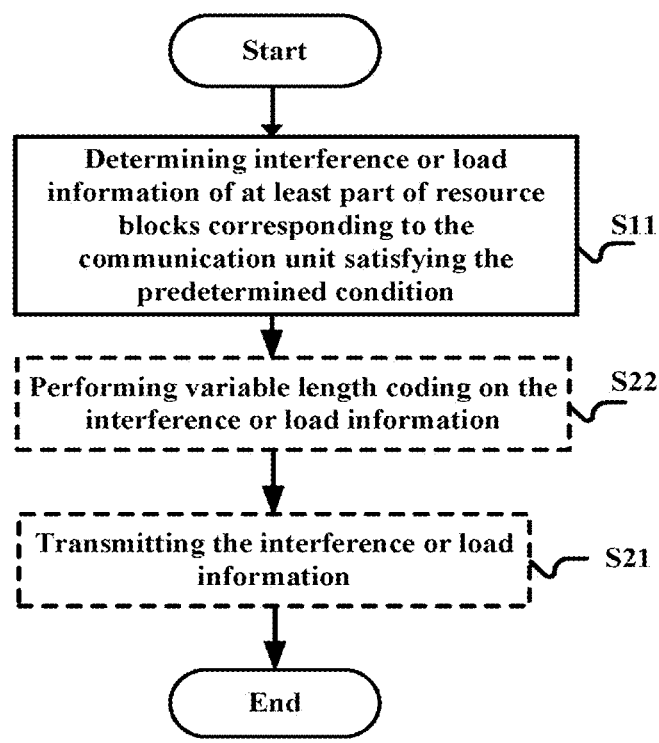
FIG. 11 is a flowchart illustrating the management method for wireless communications according to an embodiment of the present application.

FIG. 11 illustrates a flowchart of the management method for wireless communications according to an embodiment of the present application. The method includes the following step: selecting a communication unit satisfying a predetermined condition from among a cluster of communication units subject to management, and determining interference information or load information of at least part of resource blocks corresponding to the communication unit (S11).

Wherein, in the step S11, for example, the resource blocks allocated to particular user devices of the communication unit can be taken as the at least part of resource blocks.

As an example, in the step S11, the communication unit can be further selected according to channel quality and intensity of interference the communication unit is subject to. For example, it is possible to select a communication unit with a relatively high intensity of interference and good channel quality.

The predetermined condition used in the step S11 can be selected from the group consisting of: the communication unit having a high priority level for making use of frequency spectral resources, the communication unit being located at edge of regions managed by the two management apparatus, the communication unit being provided with QoS guarantee, and any combination thereof. It is to be understood that these are just examples, and the setting of the predetermined condition is not limited thereto.

The interference information can include for example an ID of the communication unit and information of interference level the communication unit is subject to. Similarly, the load information can include an ID of the communication unit and information of the amount of the load of the communication unit.

As shown by a dashed line block in FIG. 11, the above mentioned method can further include a step S21: transmitting the interference information or load information to a management apparatus corresponding to another communication unit cluster, when communication state of the communication unit satisfies a triggering condition.

As an example, the communication state of the communication unit can include one of an interference-to-noise ratio and a signal-to-interference ratio detected by the communication unit.

In addition, the above mentioned method can further include a step S22 before the step S21. encoding one of the interference information and the load information into variable-length codes to be transmitted. For example, Huffman coding can be implemented according to particular statistical characteristics.

Although not shown in FIG. 11, the above mentioned method can further include the following step: receiving the interference information or load information transmitted by a management apparatus corresponding to another communication unit cluster.

Wherein, the two management apparatus delivering one of the interference information and the load information to each other may belong to different operators, as long as there is a channel for the signaling interaction between the two.

The above mentioned method can be applied in various scenarios, including but not limited to a CRAN communication system, cognitive radio system or the like. In the CRAN scenario, the above mentioned method can be implemented for example in the BBU; while in the cognitive radio system, the above mentioned method can be implemented for example in the GLDB or the spectrum management apparatus. Of course, it is also possible to provide a separate management apparatus to implement the above mentioned method. This method reduces the processing load and further decreases the signaling overhead, by only determining the interference information or load information of the communication units satisfying the predetermined condition.

In the CRAN scenario, the communication unit cluster is a CRAN cell cluster, the communication unit is a CRAN cell, and an edge CRAN cell serving edge user devices is taken as the communication unit satisfying the predetermined condition in step S11. In addition, as an example, in the step S11, it is possible to take resource blocks allocated to the edge user devices as the at least part of resource blocks, so as to further decrease the processing load and the signaling overhead.

In step S21, it is possible to transmit the interference information to a management apparatus corresponding to another CRAN cell cluster, when the communication state of the edge CRAN cell satisfies the triggering condition. Wherein, for example, the triggering condition can be selected from the group consisting of: the interference-noise ratio of the edge CRAN cell being below a predetermined threshold; the signal-to-interference ratio of the edge CRAN cell being lower than a second predetermined threshold in the case of emitting power of the user device reaching a predetermined emitting power value, and a combination thereof. The interference-noise-ratio and the signal-to-interference ratio are average values among multiple edge CRAN cells when the multiple edge CRAN cells perform joint receiving with respect to the edge user devices.

When the multiple edge CRAN cells perform joint receiving with respect to the edge user devices, it is possible to further select, based on an overload indication value which is in direct proportion to the intensity of interference with CRAN cells and in inverse proportion to the channel quality, N edge CRAN cells from among the multiple edge CRAN cells to transmit their interference information, N being an integer and set according to the overload indication value. For example, the edge CRAN cells with a relatively high intensity of interference and good channel quality can be selected.

In addition, in the step S22, the interference information can be encoded into variable length codes to be transmitted. In order to allow the adjacent CRAN cell cluster to determine which CRAN cell is to respond to the received interference information, a physical neighborhood relationship list of neighborhood relationship among CRAN cells of adjacent CRAN cell clusters can further be stored in advance.

It is to be understood that, although the CRAN scenario is shown as a specific example of the method above, it is not limited thereto, and the method of the present application can be applied to any situation where it is necessary to selectively deliver the interference information or load information.

Figure 12:
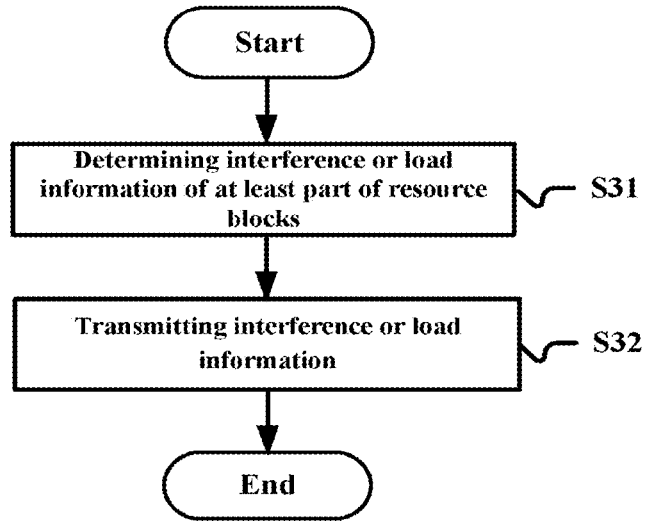
FIG. 12 is a flowchart illustrating the method for wireless communications according to an embodiment of the present application.

FIG. 12 illustrates a flowchart of the method for wireless communications according to another embodiment of the present application. The method includes: determining interference information or load information of at least part of resource blocks of a communication unit involved in communication (S31); and transmitting the interference information or load information to a management apparatus corresponding to the communication unit, when the communication unit satisfies a predetermined condition (S32).

Wherein, in the step S31, resource blocks allocated to particular user devices served by the communication unit can be taken as the at least part of resource blocks.

In CRAN scenario, the communication unit is a CRAN cell, and in the step S32, in the case that the communication unit is an edge CRAN cell serving edge user devices, it is possible to transmit its interference information to the corresponding management apparatus. For example, the interference information of resource blocks allocated to the edge user devices can be transmitted.

This method can provide the interference information or load information to the management apparatus selectively, effectively reducing the data transmitting load between the two.

It is to be noted that, the above mentioned methods can be adopted separately or in combination, the details of which have been described in detail in the first to the fifth embodiment and will not be repeated here.

The basic principle of the present invention has been described above in conjunction with particular embodiments. However, as can be appreciated by those ordinarily skilled in the art, all or any of the steps or components of the method and apparatus according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

As can be appreciated by those skilled in the art, the modules in the above mentioned apparatus such as the determining module, the storage module and so on can be implemented by one or more processors, while the modules such as the transmitting module, the encoding module, the interference information encoding module, the receiving module and so on can be implemented by circuit elements such as an antenna, a filter, a modem, a codec and so on.

Therefore, the present application further provides an electronic device (1), including a circuit, configured to: select a communication unit satisfying a predetermined condition from among a cluster of communication units subject to management, and determine interference information or load information of at least part of resource blocks corresponding to the communication unit.

According to another aspect of the invention, there is further provided an electronic device (2), including a circuit, configured to: determine interference information or load information of at least part of resource blocks of a communication unit involved in communication; and transmit the interference information or load information to a management apparatus corresponding to the communication unit, when the communication unit satisfies a predetermined condition.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 1300 shown in FIG. 13) from a storage medium or network, wherein the computer is capable of implementing various functions when installed with various programs.

Figure 13:
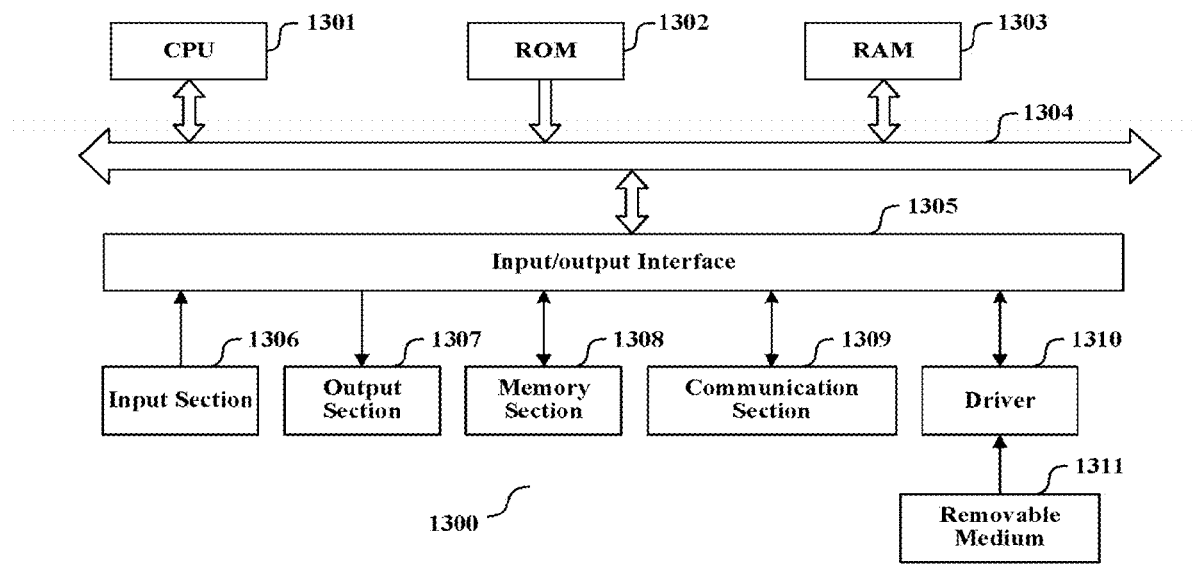
FIG. 13 is an exemplary block diagram illustrating the structure of a general purpose personal computer capable of realizing the method and/or apparatus and/or system according to the embodiments of the present invention.

In FIG. 13, a central processing unit (CPU) 1301 executes various processing according to a program stored in a read-only memory (ROM) 1302 or a program loaded to a random access memory (RAM) 1303 from a memory section 1308. The data needed for the various processing of the CPU 1301 may be stored in the RAM 1303 as needed. The CPU 1301, the ROM 1302 and the RAM 1303 are linked with each other via a bus 1304. An input/output interface 1305 is also linked to the bus 1304.

The following components are linked to the input/output interface 1305: an input section 1306 (including keyboard, mouse and the like), an output section 1307 (including displays such as a cathode ray tube (CRT), a liquid crystal display (LCD), a loudspeaker and the like), a memory section 1308 (including hard disc and the like), and a communication section 1309 (including a network interface card such as a LAN card, modem and the like). The communication section 1309 performs communication processing via a network such as the Internet. A driver 1310 may also be linked to the input/output interface 1305, if needed. If needed, a removable medium 1311, for example, a magnetic disc, an optical disc, a magnetic optical disc, a semiconductor memory and the like, may be installed in the driver 1310, so that the computer program read therefrom is installed in the memory section 1308 as appropriate.

In the case where the foregoing series of processing is achieved through software, programs forming the software are installed from a network such as the Internet or a memory medium such as the removable medium 1311.

It should be appreciated by those skilled in the art that the memory medium is not limited to the removable medium 1311 shown in FIG. 13, which has program stored therein and is distributed separately from the apparatus so as to provide the programs to users. The removable medium 1311 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1302 and the memory section 1308 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

What claimed is:

1. A management apparatus for wireless communication comprising processing circuitry, the processing circuitry being configured to: select a communication unit satisfying a predetermined condition from among a communication unit cluster, the communication unit cluster being managed by the management apparatus; and determine interference information or load information corresponding to the communication unit, wherein the predetermined condition is selected from a group of predetermined conditions consisting of: the communication unit having a high priority level for making use of spectrum resources, the communication unit being located at edge of regions managed by two management apparatuses, and the communication unit being, provided with quality of service (QoS) guarantee, and any combination thereof.

2. The management apparatus according to claim 1, wherein the processing circuitry is further configured to transmit the interference information or the load information to a corresponding management apparatus when communication state of the communication unit satisfies a triggering condition, wherein the corresponding management apparatus corresponds to another communication unit cluster.

3. The management apparatus according to claim 2, wherein the communication state of the communication unit comprises one of an interference-to-noise ratio and a signal-to-interference ratio detected by the communication unit.

4. The management apparatus according to claim 2, wherein the processing circuitry is further configured to encode one of the interference information and the load information into variable-length codes to be transmitted.

5. The management apparatus according to claim 2, wherein the processing circuitry is further configured to receive the interference information or load information transmitted by the corresponding management apparatus.

6. The management apparatus according to claim 5, wherein, the two management apparatuses delivering the interference information or the load infomiation to each other belong to different operators.

7. The management apparatus according to claim 1, wherein the processing circuitry is further configured to select the communication unit according to channel quality and intensity of interference the communication unit is subject to.

8. The management apparatus according to claim 7, wherein the communication unit has a relatively high intensity of interference and good channel quality.

9. The management apparatus according to claim 1, wherein the interference information comprises an identifier of the communication unit and information of interference level that the communication unit is subject to.

10. The management apparatus according to claim 1 wherein the communication unit cluster is a centralized radio access network (CRAN) cell cluster, the communication unit is a CRAN cell, and the processing circuitry is configured to select an edge CRAN cell serving edge user devices as the communication unit.

11. The management apparatus according to claim 10, wherein the processing circuitry is further configured to transmit the interference information to a management apparatus corresponding to another CRAN cell cluster, when the communication state of the edge CRAN cell satisfies the triggering condition.

12. The management apparatus according to claim 11, wherein the triggering condition is selected from the group consisting of: an interference-noise ratio of the edge CRAN cell being below a predetermined threshold, a signal-to-interference ratio of the edge CRAN cell being lower than a second predetermined threshold in the case of emitting power of the user device reaching a predetermined emitting power value, and a combination thereof.

13. The management apparatus according to claim 12, wherein the interference-noise-ratio and the signal-to-interference ratio are average values among multiple edge CRAN cells when the multiple edge CRAN cells perform joint receiving with respect to the edge user devices.

14. The management apparatus according to claim 11, wherein when multiple edge CRAN cells perform joint receiving with respect to the edge user devices, the processing circuitry is further configured to select, based on an overload indication value, N edge CRAN cells from among the multiple edge CRAN cells to transmit their interference information, N being an integer and set according to the overload indication value, and the overload indication value is proportional to the intensity of interference with CRAN cells and inversely proportional to the channel quality.

15. The management apparatus according to claim 10, wherein, the processing circuitry is configured to determine the interference information or load information based on resource blocks allocated to the edge user devices.

16. The management apparatus according to claim 10, wherein the processing circuitry is further configured to store a physical neighborhood relationship list of neighborhood relationship among CRAN cells of adjacent CRAN cell clusters.

17. The management apparatus according to claim 1, wherein the management apparatus is located in a geographical location database of a cognitive radio system.

18. An apparatus for wireless communication, comprising processing circuitry configured to: determine interference information or load information of a communication unit corresponding to the apparatus; and transmit the interference information or load information to a corresponding management apparatus, when the communication unit satisfies a predetermined condition, wherein the predetermined condition is selected from a group of predetermined conditions consisting of: the communication unit having a high priority level for making use of spectrum resources, the communication unit being located at edge of regions managed by two management apparatuses, and the communication unit being provided with QoS guarantee, and any combination thereof.

19. A management method for wireless communication, comprising: selecting, by a management apparatus, a cell satisfying a predetermined condition from among a cell cluster subject to management, and determining, by the management apparatus, interference information or load information corresponding to the cell, wherein the predetermined condition is selected from a group of predetermined conditions consisting of: the communication unit having a high priority level for making use of spectrum resources, the communication unit being located at edge of regions managed by two management apparatuses, and the communication unit being provided with QoS guarantee, and any combination thereof.

\* \* \* \* \*